May 16, 1944.  W. C. GRABAU  2,349,166

VOLTAGE REGULATOR

Filed Sept. 17, 1940

INVENTOR
William Christian Grabau
BY
ATTORNEY

Patented May 16, 1944

2,349,166

UNITED STATES PATENT OFFICE 2,349,166

VOLTAGE REGULATOR

William Christian Grabau, Boston, Mass., assignor to Submarine Signal Company, Boston, Mass., a corporation of Maine Application September 17, 1940, Serial No. 357,132

4 Claims. (Cl. 171—119)

The present invention relates to an electrical circuit and apparatus for regulating and controlling an alternating current line voltage between wide voltage variations.

Voltage control for alternating current supply lines is essential in practically all alternating current systems and a great amount of special devices have been designed and constructed for the purpose of maintaining constant line voltage in both alternating and direct current supply systems.

In the ordinary 110 volt alternating current supply system it is desired to maintain the voltage constant at 110 volts for all loads and in particular it is desirable to avoid fluctuations or changes in voltage with fluctuations in load.

In the present invention the desired alternating current voltages may be maintained at its predetermined value as, for instance, 110 volts without fluctuations, hunting or overshooting which otherwise frequently occurs. In the present system a separate exciter may be employed with a rheostat in the exciter field which is continually being connected out and into the field circuit in such a way as to vary the exciter field current and thereby vary the delivered exciter voltage and the main generator field.

In the present invention the alternating current voltage regulation is maintained constant through variation in the control circuit both of the applied exciter voltage and the rectified component of the voltage obtained from the alternating source whose voltage is to be controlled. The circuit and apparatus in the present case are particularly applicable to control by means of a current transformer in which, of course, the potential generated in the circuit connected with the current transformer is dependent upon the load in the generator circuit rather than upon the voltage across the system. With increasing load, therefore, the component of voltage associated with the load increases and this is compensated by the component applied from the direct current exciter source. The system in the present case permits the use of a rising voltage characteristic with increasing load which in itself has a useful application for a power line supply circuit where the load may be at a distance from the power source.

Figure 1:
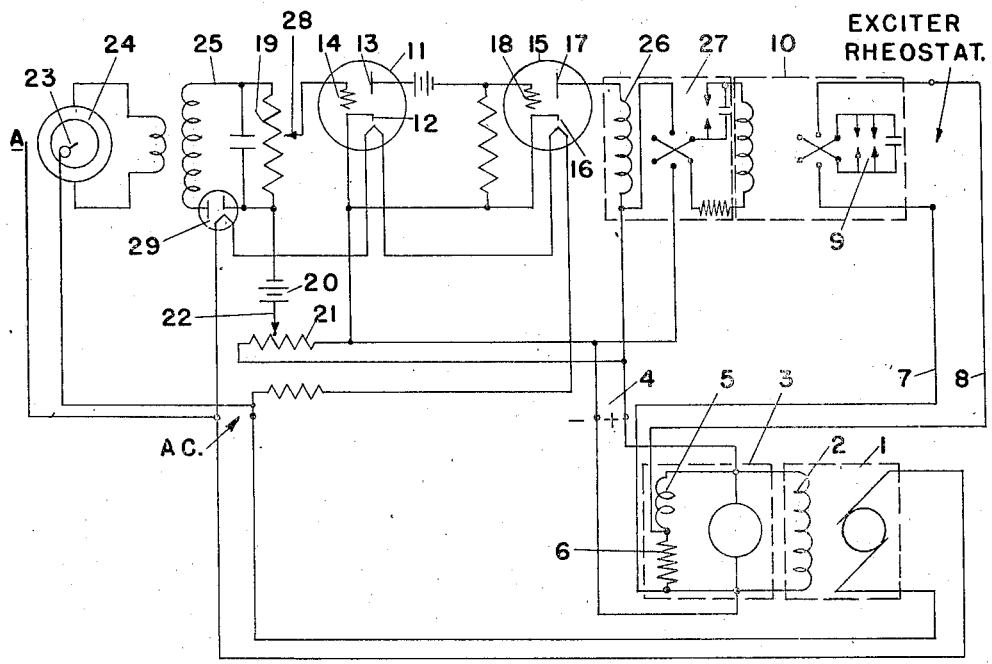
Figure 2:
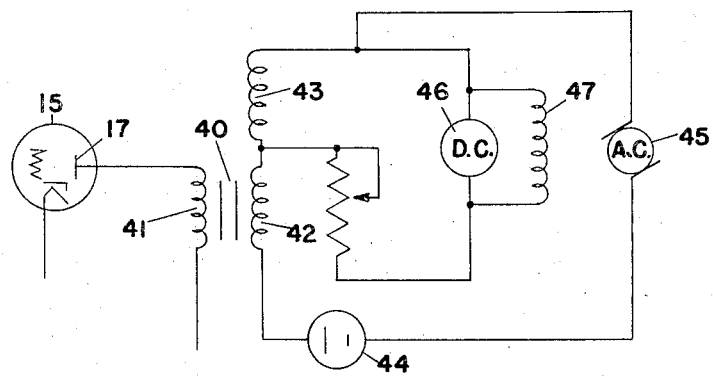

Other features and advantages of the present invention will be understood from the following description given below and taken in connection with the drawing showing an embodiment of the invention in which Fig. 1 shows the circuit arrangement, and Fig. 2 shows a modification of a portion of the circuit of Fig. 1.

In Fig. 1 the generator or alternating current supply is indicated at 1 as an alternating current machine, the flux for which is supplied by the field coil 2 energized by means of a direct current exciter 3 which may be driven on the same shaft as the alternating current generator 1, which direct current exciter supplies direct current field excitation for the field winding 2. The direct current exciter also furnishes a direct current supply for the direct current terminals 4 which are used in the control system. The exciter direct current generator is preferably self-excited through the exciter field 5 which has in series connection the exciter field rheostat 6, which elements 5 and 6 are connected in series across the exciter terminals. In the control system which will presently be described the exciter field resistance 6 is cut in and out of circuit by shorting or opening the terminal conductors 7 and 8 connected across the exciter resistance. When the resistance 6 is in circuit with the field 5 across the exciter terminals, the field strength is decreased because of the added resistance in the field circuit. This decrease in the field decreases the voltage generated by the exciter which therefore lowers the direct current voltage across the supply 4 and also lowers the current flowing in the generator field 2 and therefore the terminal voltage across the alternating current generator. On the other hand, when the exciter resistance is shorted by shorting the connection across the terminal lines 7 and 8, the field current 5 is increased with the result that the direct current exciter voltage across the supply at 4 is increased as well as the current in the field coil 2 and therefore the voltage across the terminals of the generator 1.

The shorting of the terminal conductors 7 and 8 is controlled by means of the relay switch contacts 9 of the relay 10. When the contacts 9 are closed, the circuit across the terminals 7 and 8 is closed, with the result that the voltage delivered by the generator 1 will increase, and, on the other hand, when the terminals 9 are opened, the reverse will happen, that is the voltage across the generator 1 will decrease. The alternating current supply voltage is controlled by means of the exciter and exciter circuit, just described, in connection with the vacuum tube circuit control which will now be described.

The vacuum tube control circuit includes a vacuum tube 11 with cathode 12, anode 13 and control grid 14 and a second vacuum tube 15 having a cathode 16, and anode 17 and a grid 18. The grid 14 of the first vacuum tube is connected through a potentiometer or slide wire drop 19, a bias battery 20 and a second potentiometer or slide wire drop 21 which itself is connected across the direct current supply 4. As indicated by the arrow 22 the potentiometer 21 supplies a positive potential to the grid 14 with respect to the cathode 12. As opposed to this, the bucking battery 20 supplies in series a negative bias to the grid 14 with respect to the cathode 12 while the potentiometer 19 also supplies a negative potential to the grid 14 with respect to the cathode 12. The three voltages supplied respectively through the potentiometer 21, the bucking battery 20 and the potentiometer 19 are additive to produce a grid bias for controlling the control grid 14 and the operation of the tube 11.

The voltage supplied to the potentiometer 19 comes directly from the alternating current supply line 23 by means of the current transformer 24. As the load through the line 23 is increased, the voltage delivered by the transformer 24 is increased and thereby a greater potential is impressed through the coupling transformer 25 across the potentiometer 19 in such a direction as to increase the bias on the grid 14 of the tube 11. When the grid 14 of the tube 11 becomes more negative, the plate current in the tube 11 decreases, decreasing the bias of the grid 18 in the tube 15 with respect to the cathode 16.

In this way the plate current in the tube 15 is increased, increasing the current flow in the winding 26 of the relay 27 which brings about an operation of the relay 27 which is a control relay for controlling the power relay 18, the operation of which shorts the rheostat or resistance 6 in the exciter field. Therefore, as the load through the line 23 increases initially, the rheostat or resistance 6 in the exciter field is cut out of circuit, thereby permitting the exciter terminal volts to increase and also the current through the generator field 2 and the terminal alternating current voltage across the generator 1. It will be noted, however, that the increase of the exciter voltage across the terminals 4 is in such a direction as to decrease the negative bias from the cathode to grid of the tube 11, thereby restoring the grid 14 to its normal load condition.

In the arrangement which has just been described, it will be noted that an increase in alternating current load brings about an increase in the exciter voltage generated which applies a balancing voltage against the voltage generated by the increased load. The position of the tap 23 of the potentiometer 21 and the tap 28 of the potentiometer 19 may be so adjusted to regulate the alternating current potential anywhere within the operating voltage of the system and in fact this regulation is controllable for a voltage range of at least two to three times the lowest voltage. It should be noted in the circuit just described that the alternating current source provided across the secondary of the transformer 25 is rectified by means of the rectifier 29 to produce a pulsating rectified potential across the potentiometer 19.

Initially the tap 22 is adjusted to produce the desired alternating current potential for no-load operating condition. To maintain the same voltage as the load increases, assuming that the generator speed remains constant, the field 2 must increase in proportion to the increase in load. This increase in the field 2 is brought about by the increase in the direct current exciter voltage which increases the potential across the potentiometer 21 to the take-off point 22 in proportion to the increase of the potential across the potentiometer 19 the voltage of which is controlled and related to the increase in load. In this way the increase in exciter voltage and the increase in the field current in the field 2 keep step with the increase in the alternating current load. When the load in the line 23 drops, then correspondingly the direct current exciter voltage decreases, decreasing the field 2 to provide the desired regulated voltage across the generator terminals.

In the regulation from no load to full load for any given setting of the potentiometers 19 and 21, the resistor 6 in the field exciter circuit is shorted out of the circuit progressively a greater portion of the time as the load increases and it becomes necessary for the exciter to deliver an average increased potential. The relay 18 at no load, for instance, may be closed ten percent of the time and at full load may be closed fifty percent of the time. This regulation is controllable almost within any desired range by proper choice of the various elements in the circuit. Regulation at no-load condition is obtained entirely through the direct current source 4 by means of which the grid 14 is controlled.

The voltage for the potentiometer 19 may also be obtained from a transformer connected across the line or some potential device. In this case the potential in the potentiometer 19 does not increase with current but only with voltage variations so that the increase of excitation in the field 2 called for by full load over no-load conditions must be opposed by a corresponding greater rise in the voltage across the line. To this extent the arrangement shown has a preferable advantage.

In Fig. 2 the variation of the direct current exciter field to maintain constant alternating current voltage conditions is obtained by means of a variable reactance in the exciter field circuit. In this case the plate 17 of the tube 15 which may be the same as in Fig. 1 has in its circuit the primary 41 of the transformer reactance 40, the secondary 42 of which is in a series circuit with the exciter field 43, the rectifier 44 and the alternating current machine 45 which is to be regulated.

As the current in the plate circuit of the tube 15 increases, the inductance presented by 40 to the field circuit decreases and permits more current to flow in the field circuit 43, thus increasing the voltage across the direct current exciter 46 and the alternating current field 47. Decrease of the plate current in the tube 15 works in the opposite direction to lower the alternating current voltage. The modification shown in Fig. 2 eliminates the relay action and provides field current changes in the form of a continuous curve without points having indeterminate slopes.

Having now described my invention, I claim:

1. A system for regulating the voltage under load operation of an alternating current machine having a field winding and a direct current exciter for energizing said field winding, a circuit having a field winding for said exciter and connected across said exciter, means for varying the current in said exciter field winding circuit including a vacuum tube control circuit having an initial control tube with cathode, anode and grid control electrodes, and a second control tube having an output circuit with the cathode and anode thereof energized by said exciter means for applying to said grid control electrodes of said vacuum tube control circuit in series opposing relationship, potentials relating to the terminal exciter voltage and rectified potentials proportional to the alternating current load, relay means operatively connected in the output of said vacuum tube control circuit for shorting in and out a portion of the impedance in said exciter field winding circuit, whereby the current therein varies and voltage regulation is obtained.

2. A system for regulating the voltage under load operation of an alternating current machine having a field winding and a direct current exciter for energizing said field winding, a circuit having a field winding for said exciter and connected across said exciter, means for varying the current in said exciter field winding circuit including a vacuum tube control circuit having an initial control tube with cathode, anode and grid control electrodes, and a second control tube having an output circuit with the cathode and anode thereof energized by said exciter means for applying to said grid control electrodes of said vacuum tube control circuit in series opposing relationship, potentials relating to the terminal exciter voltage and rectified potentials proportional to the alternating current load, a relay having its operating coil connected in the output of said vacuum tube control circuit and a second relay operated by said first relay for shorting in and out part of the impedance in said exciter field winding circuit, whereby the current therein varies and regulation of the alternating current generator is obtained.

3. A system for regulating the voltage under load operation of an alternating current machine having a field winding and a direct current exciter for energizing said field winding, a circuit having a field winding for said exciter and connected across said exciter, means for varying the current in said exciter field winding circuit including a vacuum tube control circuit having a pair of vacuum tubes, designated as first and second tubes, including anode, cathode and control electrodes, the anode-cathode circuit of said second tube being energized by said exciter, means for applying a potential to the control grid of said initial tube, said potential comprising two potential sources connected in series opposition, one derived from said direct current exciter and the other derived from said alternating current source to be regulated, said tubes being operatively connected together whereby an increase of the negative bias on the grid of the first tube will cause an increase in the anode-cathode current of the second tube and a decrease in negative bias of the grid of the first tube will cause a decrease in the anode-cathode current of the second tube, and relay means operatively connected in the plate circuit of the second tube for shorting in and out an impedance in the field winding circuit of said exciter whereby the current therein varies and the alternating current voltage is regulated.

4. A system for regulating the voltage under load operation having an alternating current machine having a field winding and a direct current exciter for energizing said field winding, a circuit having a field winding for said exciter and connected across said exciter, means for varying the current in said exciter field-winding circuit including a vacuum tube control circuit having an initial control tube with cathode, anode and grid control electrodes and a second control tube including anode, cathode and control grid electrodes having an output circuit with the cathode and anode thereof energized by said exciter, means for applying to said grid control electrodes of said vacuum tube control circuit in series opposing relationships, potentials relating to the terminal exciter voltage and rectified potentials proportional to the alternating current load, and means operative through the output of said second vacuum tube for varying the impedance in said exciter field winding circuit whereby the current therein varies.

WILLIAM CHRISTIAN GRABAU.